United States Patent [19]

Song et al.

[11] Patent Number: 5,539,467
[45] Date of Patent: Jul. 23, 1996

[54] B-FRAME PROCESSING APPARATUS INCLUDING A MOTION COMPENSATION APPARATUS IN THE UNIT OF A HALF PIXEL FOR AN IMAGE DECODER

[75] Inventors: Ki H. Song; Chang P. Lee, both of Seoul, Rep. of Korea

[73] Assignee: Goldstar Co., Ltd., Seoul, Rep. of Korea

[21] Appl. No.: 305,636

[22] Filed: Sep. 14, 1994

[30] Foreign Application Priority Data

Sep. 14, 1993 [KR] Rep. of Korea .................... P93-18435
Dec. 30, 1993 [KR] Rep. of Korea .................... P93-31209

[51] Int. Cl.⁶ ..................................................... H04N 7/32
[52] U.S. Cl. ......................................... 348/402; 348/699
[58] Field of Search ..................................... 348/384, 390, 348/400–402, 407, 412, 413, 415, 416, 420, 699; H04N 7/133, 7/137

[56] References Cited

U.S. PATENT DOCUMENTS

| | | | |
|---|---|---|---|
| 4,937,666 | 6/1990 | Yang | 348/413 |
| 5,134,477 | 7/1992 | Knauer et al. | 348/416 |
| 5,355,168 | 10/1994 | Sugiyama | 348/416 |
| 5,398,079 | 3/1995 | Liu et al. | 348/699 |
| 5,408,269 | 4/1995 | Tsukagoshi | 348/416 |
| 5,461,423 | 10/1995 | Tsukagoshi | 348/416 |

*Primary Examiner*—Tommy P. Chin
*Assistant Examiner*—Richard Lee
*Attorney, Agent, or Firm*—Pennie & Edmonds

[57] ABSTRACT

A B-frame processing apparatus including a motion compensation apparatus in the unit of a half pixel for an image decoder adapted to a video appliance such as HDTV. According to the apparatus, motion compensation in the unit of a half pixel is performed in real time with respect to the image having been motion-compensated by frame memories, the half pixel motion-compensated image data is added by an adder to the image data provided from a restoring section, and then the added image data is provided to the frame memories for performing motion. compensation in the unit of a pixel, while the order of the input image is adjusted corresponding to the display order of the final output image.

4 Claims, 7 Drawing Sheets

B-FRAME PROCESSING APPARATUS INCLUDING A MOTION COMPENSATION APPARATUS IN THE UNIT OF A HALF PIXEL FOR AN IMAGE DECODER

BACKGROUND OF THE INVENTION

1. Field of the Invention

The present invention relates to an apparatus for processing I, P and B-frames-for an image decoder adapted to a video appliance such as a high definition television (hereinafter referred to as HDTV), and more particularly to an appratus which can reduce memory capacity for processing B-frame and perform image motion compensation in the unit of a half pixel for B-frame, thereby obtaining a high definition picture.

2. Description of the Prior Art

An image motion compensation apparatus in the conventional image decoder restores original image data by adding values of pixels, whose displacement correspond to motion vectors transmitted from the current frame memory, to values which are finally IDCT(Inverse Discrete Transform)-transformed. However, there has been a problem in that the conventional apparatus is insufficient to get high picture quality because it performs motion compensation only in the unit of a pixel.

SUMMARY OF THE INVENTION

The present invention has been made to overcome the problems involved in the prior art.

It is an object of the present invention to provide an apparatus for image motion compensation in the unit of a half pixel for an image decoder which can improve picture quality and the encoding rate of a video signal by performing image motion compensation even in the unit of a half pixel for B-picture as provided by the MPEG II algorithm.

It is another object of the present invention to provide an apparatus for processing B-frame for an image decoder which can perform motion compensation in the unit of a half pixel for B-frame of image with memory whose capacity is small.

In one aspect of the present invention, there is provided a B-frame processing apparatus for an image decoder comprising:

a variable length decoder for decoding an encoded-input video signal with variable length codes;

a restoring means for performing an inverse quantization and an IDCT transform with respect to an image signal provided from said decoder;

a delay and order adjusting means for adjusting said IDCT transform and motion compensation with respect to said image signal provided from said restoring means;

a motion position transmitting means for providing a motion position of a current processed block in accordance with image information provided from said decoder;

a motion vector adjusting means for providing a motion vector in the unit of a pixel in accordance with said information provided from said decoder;

a frame mode information means for providing frame mode information in accordance with said information provided from said decoder;

first and second- frame memories for performing motion compensation in the unit of a pixel, respectively;

first and second read address generators for generating read addresses of said first and second frame memories;

a first write address generator for generating write addresses of said first and second frame memories;

first and second multiplexers for selectively providing said read and write address;

a bi-directional latch for storing and providing frame image of said first and second frame memories;

a mean value calculating means for calculating a mean value of a signal provided from said bi-directional latch;

a delay control and selection means for selectively providing the compensated signal from said first or second frame memory and the signal from said mean value calculating means in accordance with said information provided from said decoder;

an adder for adding the output of said restoring means to the output of said delay control and selection means;

third and fourth frame memories for storing the image signal provided from said adder in order to adjust an image input order and a display arterial;

a delay control means for controlling the delay time of the image signal provided from said third and fourth frame memories;

a slice buffer for providing the image signal outputted from said adder without storing the signal in said first or second frame memory;

a third read address generator for generating read addresses of said third and fourth frame memories;

a second write address generator for generating write addresses of said third and forth frame memories;

a fifth multiplexer for providing the output of said third read address generator to said third and fourth frame memories selectively; and a sixth multiplexer for providing the output of said second write address generator to said third and fourth frame memories, selectively.

In another aspect of the present invention, there is provided a motion compensating apparatus in the unit of a half pixel, comprising:

a variable length decoder for decoding encoded input image data and motion vector information;

a restoring means for inverse-quantizing and IDCT-transforming the decoded image data from said variable length decoder;

a delay and order adjusting means for adjusting the IDCT transform and motion compensation with respect to the image signal provided from said restoring means:

a motion vector analyzing means for analyzing the value of a motion vector by calculation the address point corresponding to the displacement which is to be motion compensated for and by utilizing the value of the motion vector provided by said variable length decoder;

a read address generator for generating a data read address of a processed block to be compensated for by utilizing a frame synchronizing signal of image data from said variable length decoder;

a write address generator for generating a data write address of the processed block to be compensated for by utilizing a frame synchronizing signal of the image data from said variable length decoder;

a first multiplexer for selectively providing the addresses provided from said read address generator and said write address generator in the unit of a frame;

first and second frame memories for alternately reading/writing the image data provided from said first multiplexer in accordance with the read/write addresses provided from said first multiplexer;

an auxiliary block memory address generator, which receives the value of the motion vector provided from said motion vector analyzing means, for generating the read address of an auxiliary block memory which is employed to calculate the pixel value corresponding to a half pixel motion vector;

a second multiplexer for alternately providing the output data of said first frame memory to a first auxiliary block memory means and to a second auxiliary block memory means;

a third multiplexer for alternately providing the output data of said second frame memory to a first auxiliary block memory means and to a second auxiliary block memory means;

an auxiliary block memory and interpolation controlling means for controlling the read point of the first and second auxiliary block memory means and an enable timing of an interpolation means by combining the address outputted from said auxiliary block memory address generating means and the value of the motion vector;

first and second auxiliary block memory means for providing data corresponding to the half pixel motion vector in accordance with the control signal provided from said auxiliary block memory and interpolation controlling means after storing the data provided from said second or third multiplexer therein;

a fourth multiplexer for selectively providing the output data of said first or second auxiliary block memory means to an interpolation means;

an interpolation means for generating image data which is finally motion-compensated-corresponding to the value of the half pixel motion vector by calculating the data provided from said fourth multiplexer;

an adder for adding the motion-compensated image data from said interpolation means to the inverse-quantized and IDCT-transformed image data from said delay and order adjusting means; and a fifth multiplexer for providing the image data provided from said adder to said first and second frame memories in the unit of frame.

BRIEF DESCRIPTION OF THE DRAWINGS

The above objects and other advantages of the present invention will become more apparent by describing the preferred embodiments thereof with reference to the accompanying drawings, in which.

DETAILED DESCRIPTION OF THE PREFERRED EMBODIMENTS

Figure 1:
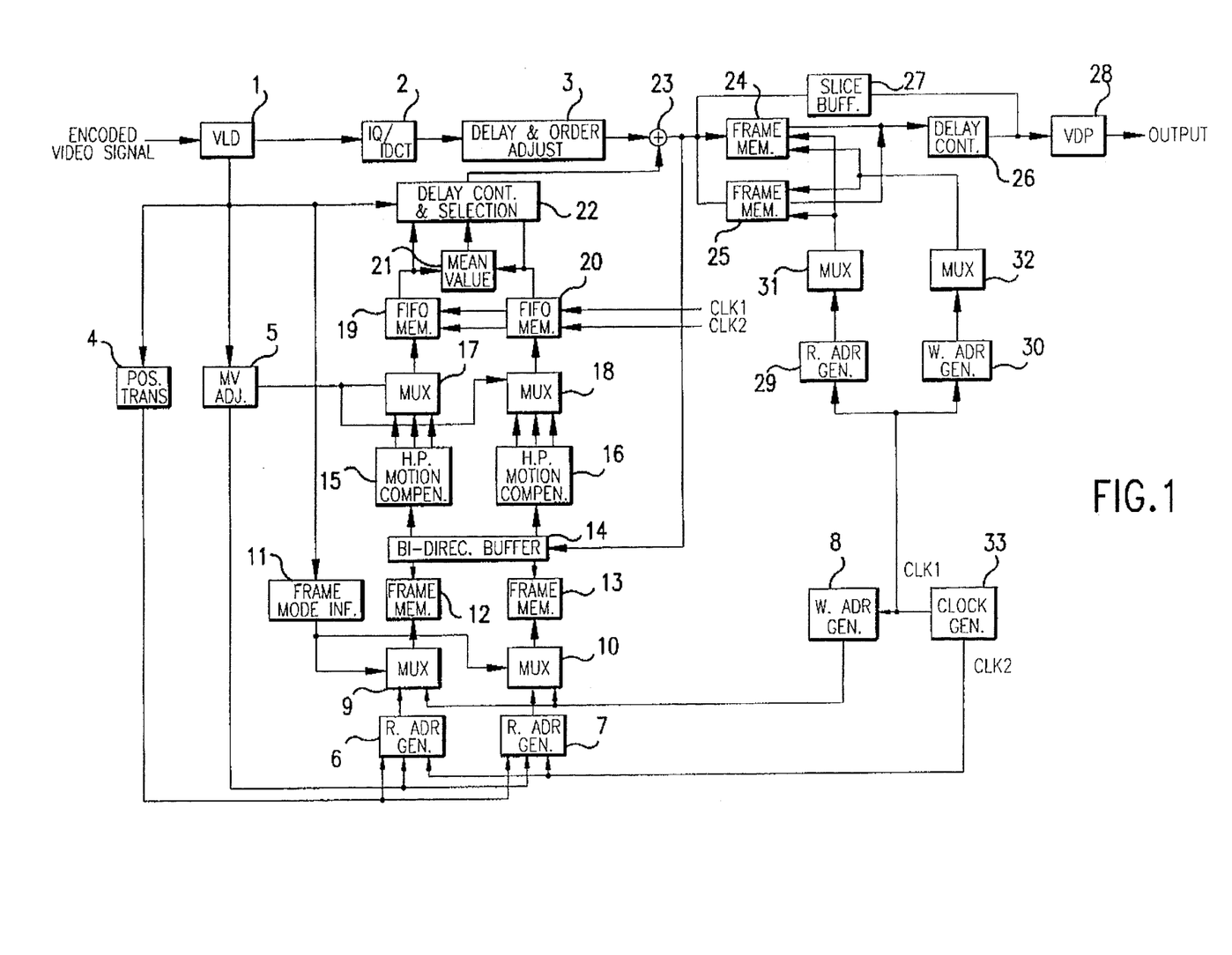
FIG. 1 is a block diagram of the first embodiment according to the present invention.

FIG. 1 shows a B-frame processing apparatus including a motion compensation apparatus in the unit of a half pixel according to the present invention. Referring to FIG. 1, a B-frame processing apparatus is provided with a variable length decoder (hereinafter referred to as VLD) 1 for decoding an input video signal which was encoded with variable length codes, a restoring section 2 for performing inverse quantization and an IDCT transform with respect to the output video signal from the decoder 1, a delay and order adjusting section 3 for adjusting the IDCT transform and motion compensation with respect to the output video signal from the restoring section 2, a motion position transmitting section 4 for providing a motion position of the current processed block in accordance with information outputted from the decoder 1, and a motion vector adjusting section 5 for providing a motion vector in the unit of a pixel in accordance with the image information outputted from the decoder 1.

The present apparatus is also provided with first and second frame memories 12 and 13 for performing motion compensation in the unit of a pixel, respectively, first and second read address generators 6 and 7 for generating read addresses of the first and second frame memories 12 and 13, a first write address generator 8 for generating write addresses of the frame memories 12 and 13 so as to perform motion compensation, first and second multiplexers 9 and 10 for selectively providing the read addresses and the write addresses, a frame mode information section 11 for controlling read address selecting operations of the multiplexers 9 and 10 in accordance with the frame mode information, first and second half pixel motion compensations 15 and 16 for performing motion compensation in the unit of a half pixel with respect to an input image signal, respectively, a bi-directional latch 14 for bi-directionally latching data between the frame memories 12 and 13 and the half pixel motion compensators 15 and 16, third and fourth multiplexers 17 and 18 for selectively providing outputs of the half pixel motion compensators 15 and 16 under the control of the motion vector adjusting section 5, first and second FIFO memories 19 and 20 for storing output data of the multiplexers 17 and 18 in order to obtain image data whose unnecessary interpolation value is removed and which are synchronized with a main clock CLK1, a mean value calculating section 21 for calculating mean values of the output signals from the first and second FIFO memories 19 and 20, a delay control and selection section 22 for selectively providing a motion-compensated signal from the frame memory 12, a motion-compensated signal from the frame memory 13, or a signal averaged by the mean value calculating section 21 in accordance with the information outputted from the decoder 1, and an adder 23 for adding the output of the delay and order adjusting section 3 and the output of the delay control and selection section 22.

The present apparatus is also provided with third and fourth frame memories 24 and 25 for storing image data provided from the adder 23 in order to control the order of the input image and the order of image display, a delay control section 26 for controlling the delay time of video signal provided from the frame memories 24 and 25, a slice buffer 27 for providing the video signal outputted from the adder 23 without storing the video signal in the frame memories, an image processing section 28 for displaying the image signal outputted from the delay control section 26 or the image signal outputted from the slice buffer 27, third read address generator 29 for generating read addresses of the third and fourth frame memories 24 and 25, a second write address generator 30 for generating write addresses of the third and fourth frame memories 24 and 25, a fifth multiplexer 31 for providing the output of the third read address generator 29 to the third and fourth frame memories 24 and alternately, a sixth multiplexer 32 for providing the output of the second write address generator 30 to the third and fourth frame memories 24 and 25, alternately, and a clock generator 33 for generating clocks in order to operate the address generators.

Motion compensating operation in the unit of a half pixel and B-frame processing operation of the present invention constructed as above will be described in detail.

Decoder 1 decodes the encoded video signal and provides the decoded image data to the restoring section 2. The decoder 1 also provides to the corresponding blocks motion vectors which enter with the image data, motion position information of the blocks which are to be motion-compensated, and the current frame(I,B, and P-frames) information.

Restoring section 2 restores pixel data by inverse-quantizing and IDCT-transforming the input image data. Specifically, the image data is compensated as much as movements at the previous I or P-frame in the case of P-frame or B-frame which is not intra frame mode, and the pixel data provided from the restoring section 2 enter the delay and order adjusting section 3. At this time, since IDCT transform is performed in the unit of 8×8 pixels and motion compensation is performed in the unit of 16×16 pixels, the delay and order adjusting section 3 adjusts the difference and then provides it to the adder 23.

Meanwhile, the motion position transmitting section 4 provides to the first and second read address generators 6 and 7, respectively the position information of the current processed block from the output data of the decoder 1, and motion vector adjusting section 5 provides to the first and second read address generators 6 and 7 motion vectors whose unit is a pixel from the output data of the decoder 1.

At this point, since motion compensation is performed at the two frames i.e., P and I-frames which are received most recently in B-frame mode, the respective read address generators 6 and 7 are presented in order to read data from the first and second frame memories 12 and 13 at the same time.

Read address generators 6 and 7 count the clock CLK2 provided by the clock generator 33 and generate read addresses for motion compensation in the unit of a pixel by calculating motion vectors whose unit is a pixel and are provided from the motion vector adjusting section 5 and the position of the current processed block provided from the motion position transmitting section 4, where the clock CLK2 is CLK1×(17×17)/(16×16).

Read addresses provided from the first and second read address generators 6 and 7 alternately enter the frame memories 12 and 13 through the first and second multiplexers 9 and 10 which are controlled by the frame mode information section 11. That is, the read addresses of the read address generators 6 and 7 for motion compensation are provided to the two frame memories 12 and 13, respectively, in B-frame mode, while the read addresses of the read address generators 6 and 7 and the write address of the write address generator 8 are selectively provided to the frame memories 12 and 13 according to the order in I or P-frame frame mode. First write address generator 8 generates write addressee of the frame memories 12-1 and 13 by counting the main clock CLK1 provided from the clock generator 33.

The image data having been motion-compensated in the unit of a pixel in accordance with read/write addresses, and read by the first and second frame memories 12 and 13, enter the half pixel motion compensators 15 and 16 by way of the bi-directional latch 14 which can perform read/write operation through the same route.

First and second motion compensators 15 and 16 estimate the motion in the unit of a half pixel with respect to the input image data and then compensate the motion in the unit of a half pixel. The motion compensation operation in the unit of a half pixel will be described in detail.

Figure 2:
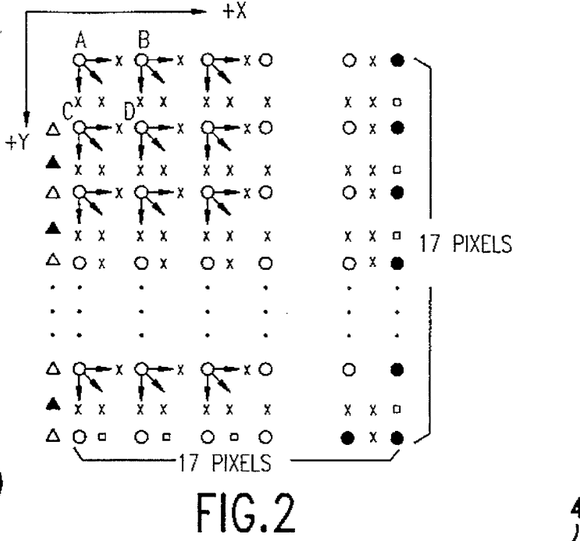
FIG. 2 is a pixel diagram of a processed block for motion compensation in the unit of a half pixel according to the present invention.

First, according to the motion compensating process in the unit of a half pixel based on the MPEG II algorithm as shown in FIG. 2, motion estimation is performed in the unit of a half pixel at the motion compensation processed block (17×17 pixels) whose unit is a half pixel, and if the value is down a decimal point, the value is converged on the integer in the −∞ direction. In other words, motion compensation in the unit of a half pixel is realized considering only the +X and +Y directions without the −X and −Y directions. In FIG. 2, symbol X is a half pixel point and o is a pixel point. In addition, △▲□ indicate the unnecessary interpolated values due to the boundary and ● shows data which are on the right side and in the lower part of the processed block(16×16 pixels) for interpolation on the 16×16 boundary.

Figure 3:
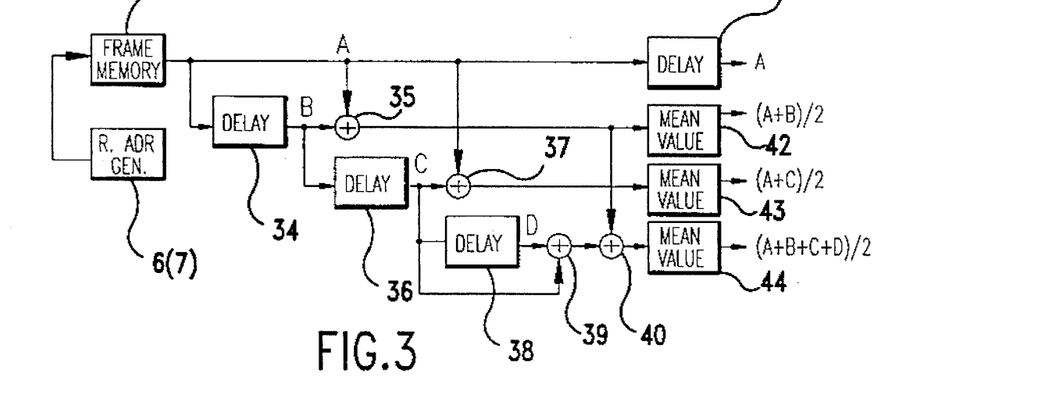
FIG. 3 is a block digram of the motion compensating apparatus in the unit of a half pixel, according to the present invention.

FIG. 3 shows the construction of the half pixel motion compensator which performs motion compensation in the processed block whose unit is a half pixel. With reference to FIG. 3, the motion compensator whose unit is a half pixel is provided with a first delay element 34 for 1-sample-clock-delaying pixel data A whose position is to be motion-compensated and which are provided from the frame memory, a first adder 35 for adding the pixel data B having been delayed by the first delay element 34 to the pixel data A, a second delay element 36 for 16-sample-clock-delaying the pixel data B having been delayed by the first delay element 34, a second adder 37 for adding the pixel data C having been delayed by the second delay element 36 to the pixel data A, a third delay element 38 for 1-sample clock delaying the pixel data C having been delayed by the second delay element 36, a third adder 39 for adding the pixel data D having been delayed by the third delay element 38 to the pixel data C, a fourth adder 40 for adding the output pixel data from the third adder 39 to the output pixel data from the first adder 35, a fourth delay element 41 for 24-sample-clock-delaying the pixel data A, a first mean value calculating section 42 for averaging the output pixel data from the first adder 35, a second mean value calculating section 43 for averaging the output pixel data from the second adder 37, and a third mean value calculating section 44 for averaging the output pixel data from the fourth adder 40.

The operation of the motion compensator in the unit of a half pixel constructed as above will now be described.

First, the fourth delay element 34 provides the input pixel value A just as it is while only delaying the pixel data A as much as the 24-sample clock, where the pixel data A whose position is to be motion-compensated and which are provided from the frame memory as shown in FIG. 2. First delay element 35 provides the pixel data B which are 1-sample-clock-delayed from the pixel data A, where the pixel data B ate added to the pixel data A by the first adder 35 and then are averaged by first mean valye calculating section 42 which provides the value of (A+B)/2 finally. Second delay element 36 provides the pixel data C which are 16-sample-clock-delayed from the pixel data B, where the pixel data C are added to the pixel data A by the second adder 37 and then are averaged by the second mean value calculating section 43 which provides the value of (A+C)/2 finally. Additionally, the third delay element 38 provides the pixel data D which are 1-sample-clock-delayed from the pixel data C, where the pixel data D is added to the pixel data C by the third adder 39. The added value (C+D) is added to the output (A+B) of the first adder 35 by the fourth adder 40. Accordingly, the third mean value calculating section 44 provides the value of (A+B+C+D)/4 finally.

The result and pixel data having been motion-compensated as above are selectively provided to the FIFO memories 19 and 20 from the third and fourth multiplexers 17 and 18 under the control of the motion vector adjusting section 5 as shown in FIG. 1. That is, multiplexers 17 and 18 provide the pixel data A if there is no half pixel motion, the value of (A+B)/2 if there is half pixel motion in the X direction, the value of ( A+C)/2 if there is half pixel motion in the Y direction, and the value of (A+B+C+D)/4 if there is half pixel motion in both X and Y directions, thereby performing motion compensation in the unit of a half pixel.

In order to perform the interpolation of the processed block (17×17 pixels) in real time, the read operation of the frame memories 12 and 13 is executed according to the clock CLK2 which is obtained by the equation CLK2= CLK1×{(17×17)/(16×16)}, as stated above. In this case, the first and second FIFO memories 19 and 20 are used for the purpose of obtaining image data whose unnecessary interpolation values are removed and which are synchronized with the main clock CLK1. Specifically, the FIFO memories 19 and 20 provide image data synchronized with the main clock by storing pixel data selected by the multiplexers 17 and 18 in accordance with the clock CLK2 and by reading the pixel data in accordance with the main clock CLK1. The image data provided from the memories enter the delay control and selection section 22 and simultaneously enter the mean value calculating section 21 which calculates the mean value.

Delay control and selection section 22 selects the signal motion-compensated by the first frame memory 12 with respect to B-picture, the signal motion-compensated by the second frame memory 13 or the signal averaged by the mean value calculating section 21, and provides the selected signal to the adder 23.

Adder 23 adds the image signal inverse-guantized and IDCT-transformed by the delay and order adjusting section 3 to the image signal motion-compensated by the delay control and selection section 22. In other words, in the P or B-frame mode except for I-frame, the image is completely restored by the adder 23 and is displaced based on the image processing unit for display. At this time, the input order is different from the display order and the difference thereof is adjusted as follows.

Figure 4:
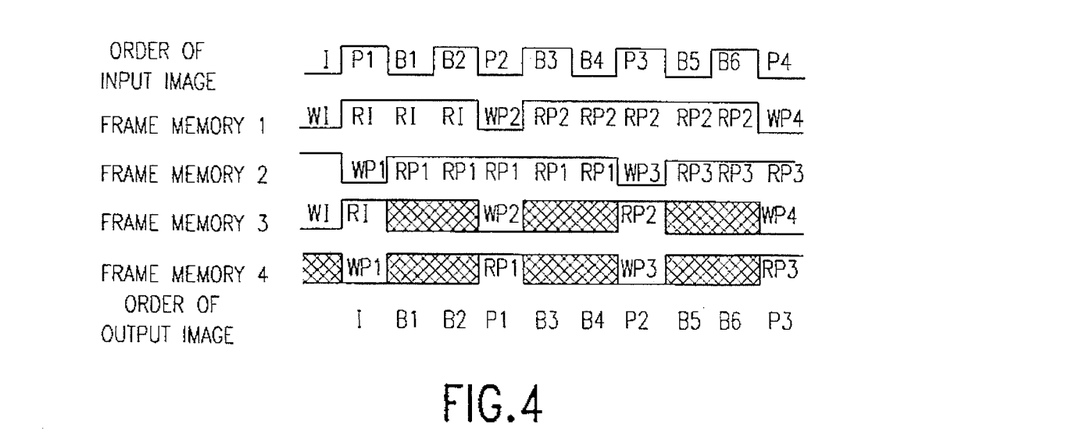
FIG. 4 is a view explaining frame memory control and order of input/output image according to the present invention.

As shown in FIG. 4, when the I-frame is inputted, the I-frame data are inverse-quantized and IDCT-transformed by the restoring section 2 and then the restored data are stored in the first and third frame memories 12 and 24. After this, when the first P-frame P1 enters, the P-frame data is added by the adder 23 to the value which is motion compensated by the first frame memory 12, i.e., the output of the delay control and selection section 22, and then are stored in the second and fourth frame memories 13 and 25. At the same time, the I-frame data having been stored in the third frame memory 24 are read, passing through the delay control section 26, so as to be delay-time-compensated, then being provided to the image processing section 28.

Next, when the first B-frame B1 enters, the value which is motion-compensated, respectively, by the first and second frame memories 12 and 13, i.e., the output of the delay control and selection section 22, is added by adder 23 to the image signal inverse-quantized and IDCT-transformed. The added value is directly provided to the image processing section 28 through the slice buffer 27 without being stored in the frame memory. The next B-frame B2 is also provided to the image processing section 28 in the same way.

On the other hand, when the second P-frame P2 enters, the value which is motion-compensated by the second frame memory 13, i.e., the output of the delay control and selection section 22 is added by the adder 23 to the restored image data which has been inverse-quantized and IDCT-transformed, and then the added value is stored in the first and third frame memories 12 and 24. At the same time, the data of the first P-frame P1 stored in the fourth frame memory 25 are read out and provided to the image processing section 28, thereby changing the display order of the image. other input image order and the display order with respect to the next frames are adjusted similarly.

At this point, the third and fourth frame memories 24 and 25 perform read/write operation of the image data as stated above in accordance with the read address of the third read address generator 29 and the write address of the second write address generator 30, which addresses are selectively provided thereto by way of the fifth and sixth multiplexers 31 and 32.

In addition, the third read address generator 29 generates read addresses of the frame memories 24 and 25 by counting the main clock CLK1 which is provided from the clock generator 33, and the second write address generator 30 generates write addressee of the frame memories 24 and 25 by counting the main clock CLK1 which is provided from the clock generator 33.

When the read/write timing of the frame memories is as shown in FIG. 4, with respect to the input image order of I, P1 B1, B2, P2, B3, B4, P3, B5, B6, P4, . . . , the read address of the first read address generator 6 and the write address of the first write address generator 8 are selectively provided to the first frame memory 12 by the, first multiplexer 9. Accordingly, the first frame memory 12 has a read/write timing which consists of I-frame write (WI), I-frame read(RI), RI, RI, P2-frame write (WP2), P-2-frame read (RP2), RP2, RP2, RP2, RP2, P4-frame write (WP4), . . . , and stores and provides the image data, while the second frame memory 13 has a read/write timing which consists of P1-frame write (WP1), P1-frame read (RP1), RP1,RP1, RP1, RP1, P3-frame write (WP3), P3-frame read (RP3), RP3, RP3, . . . , and stores and provides the image data. Besides, the third frame memory 24 has a read/write timing which consists of I-frame write (WI), RI, WP2, RP2, WP4, . . . and the fourth frame memory 25 has a read/write timing which consists of P1-frame write (WP1), RP1, WP3, RP3, . . . , where both frame memories 24 and 25 also store and provide the image data.

Thus, the output image sequence is as shown in FIG. 4, that is, I-frame read (RI) output I of the frame memory 24, direct output B2 of the input image B1 provided from the slice buffer 27, first P-frame read(RP1) output P1 of the frame memory 25, direct output B4 of the input image B3, second P-frame read (RP2) output P2 of the frame memory 24, direct output B6 of the input image B5, third P-frame read (RP3) output P3 of the frame memory 25, . . .

From the foregoing, according to the present invention, picture quality and encoding rate of an HDTV can be improved by implementing motion compensating apparatus whose unit is a half pixel, considering B-picture based on the MPEG II algorithm. Besides, the clock CLK2 which is faster than the the main clock CLK1 is used and the FIFO memories are employed in order to motion-compensate in the unit of a half pixel, thereby Simplifying and optimizing the design procedure.

However, the first embodiment of the B-frame processing apparatus according to the present invention needs a number of frame memories 12, 13, 24 and 25 and thus gives rise to large memory capacity. Accordingly, the second embodiment of the B-frame processing apparatus according to the present invention is provided so as to reduce the number of required frame memories.

Figure 5:
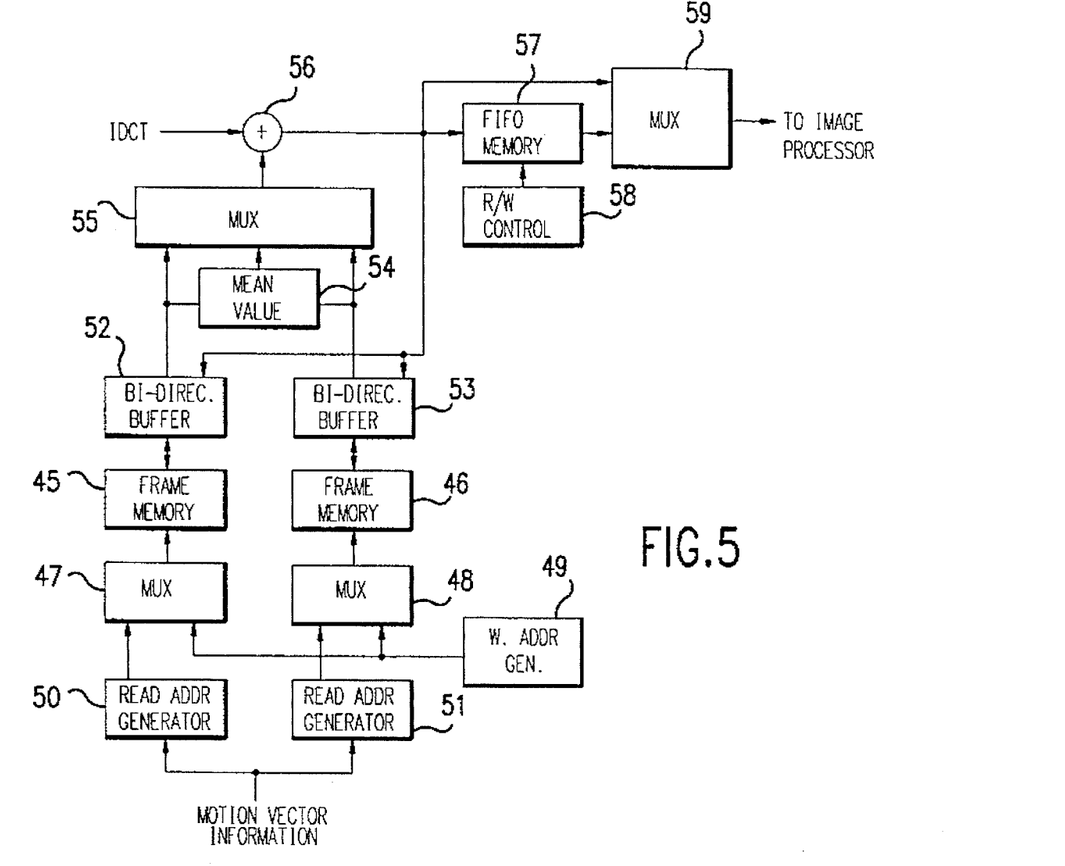
FIG.5 is a block diagram of the second embodiment according to the present invention.

FIG. 5 shows a block diagram of the second embodiment according to the present invention. Referring to FIG. 5, the present B-frame processing apparatus comprises first and second frame memories 45 and 46 for storing frame image therein, first and second multiplexers 47 and 48 for providing read/write addresses of the frame memories 45 and 46, a write address generator 49 for generating write addresses of the frame memories and providing the write address to the multiplexers 47 and 48, a first read address generator 50 for generating read address of the frame memory 45 when its input is the motion vector information and providing the address to the first multiplexer 47, a second read address generator 51 for generating read address of the frame memory 46 when the motion vector information is regarded as input and providing the address to the second multiplexer 48, bi-directional latches 52 and 53 for providing an output image signal of an adder 56 to the frame memories 45 and 46 and providing image signals read out from the frame memories 45 and 46, a mean value calculating section 54 for averaging the image signals provided from the latches 52 and 53, a multiplexer 55 for selectively providing the output image signal of the latch 52 or 53 and the averaged image signal from the mean value calculating section 54, an adder 56 for adding the output image signal of the multiplexer 55 to the IDCT-transformed image signal, a FIFO memory 57 for reading/writing the added image signal, a read/write oontroller 58 for controlling read/write operation of the FIFO memory 57, and a multiplexer 59 for selectively providing the output video signal of the adder 56 and the output video signal of the FIFO memory 57 so as to be suitable for the current frame mode.

The operation of the second embodiment of the B-frame processing apparatus constructed as above will be described in detail.

Figure 6:
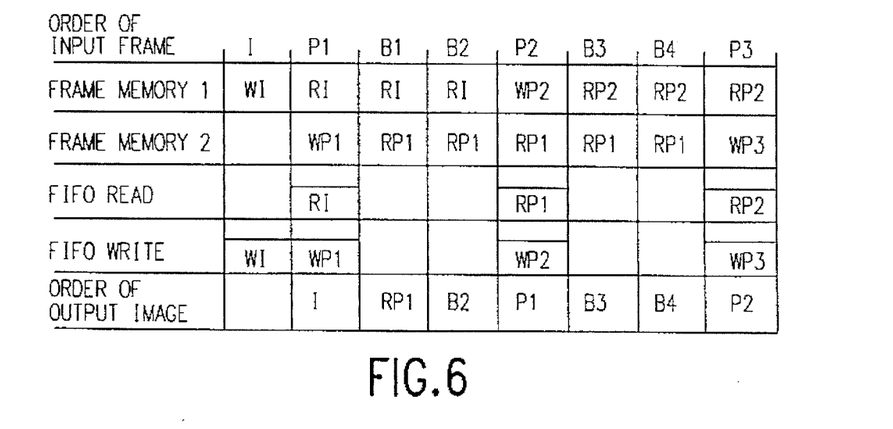
FIG.6 is a signal timing diagram of the second embodiment according to the present invention.

The input frame order having been encoded by an encoder is as shown in FIG. 6, i.e., I, P, B, B, P, . . . .

First, when the I-frame enters, the image signal of the I-frame is stored in the first frame memory 45 through the adder 56 and the bi-directional latch 52. The write address of the first frame memory 45 is generated by the write address generator 49 and is provided through the first multiplexer 47. At this time, a data bus passes through the bi-directional latches 52 and 53, alternately with a period of frame and is stored in the respective frame memories, and the write address of the frame memory 46 corresponds to the address of the write address generator 49 Which is provided through the second multiplexer 48. Meanwhile, the image signal of the I-frame is also stored in the FIFO memory 57 under the control of the read/write controller 58. The FIFO memory 57 has a capacity of one frame in order to delay the signal for one frame.

Next, when the P1-frame enters, the I-frame image signal having been stored previously is read out from the first frame memory 45 and enters the adder 56 through the bi-directional latch 52 and the multiplexer 55, and then is added to the P1-frame image signal. The added video signal passes through the bi-directional latch 53 again and then is stored in the second frame memory 46. The read address of the first frame memory 45 may be generated by the first read address generator 50 utilizing motion vectors and is selectively provided by the first multiplexer 47.

At this point, the FIFO memory 57 starts to read the previous I-frame under the control of the read/write controller 58 and simultaneously stores P1 image data provided from the adder 56. The output image signal of the previous I-frame is provided to the image processing section by way of the multiplexer 59 which selectively provides to the image processing section the output image signal of the adder 56 and the output image signal of the FIFO memory 57 in accordance with frame mode.

THE FIFO memory 57 can store the P1-frame image signal and provide a I-frame image signal at the same time as stated above. Thereafter, when the the B1-frame enters, the frame memories 45 and 46 stop write operation and perform only image data read operation in accordance with read addresses provided from the read address generators 50 and 51 through the multiplexers 47 and 48.

At this point, the image data having been read in accordance with read addresses from the read address generators 50 and 51 whose input are motion Vectors, are provided through the bi-directional buffers 52 and 53 and the provided image data are averaged by the mean value calculating section 54. Multiplexer 55 provides the averaged image data, i.e., the motion-conpensated image, selectively to adder 56 Specifically, the image signal of the B-frame is determined through the multiplexer 55 because it may be selected from the previous frame and the next frame or may be provided from the mean value of the two frames.

At this moment, FIFO memory 57 does not perform read/write operations and stores the image signal of the P1-frame having been written previously. The operation of the next B2-frame is performed in the same way. When P2-frame enters again, the image signal of P2-frame is processed according to the same order as that of the I or P1-frame and the output order of the multiplexer 59 is able to be displayed in accordance with respective frame modes as shown in FIG. 6, i.e., I, B, B, P.

The second embodiment of the present invention may employ a motion compensating apparatus whose unit is a half pixel which includes half pixel motion compensators 15 and 16, multiplexers 17 and 18, and FIFO memories 19 and 20 as shown in FIG. 1, motion compensation in the unit of a half pixel can be performed, and thus the B-frame processing apparatus for processing the image signal which is motion compensated for in the unit of a half pixel considering B-frame can be implemented.

Motion compensating apparatus whose unit is a half pixel according to the second embodiment has the same construction and operation as those of the first embodiment and thus the descriptions thereof will be omitted. Besides, the selection of multiplexers 47, 48 and 55 is controlled according to the same control signal as that of the first embodiment.

Figure 7:
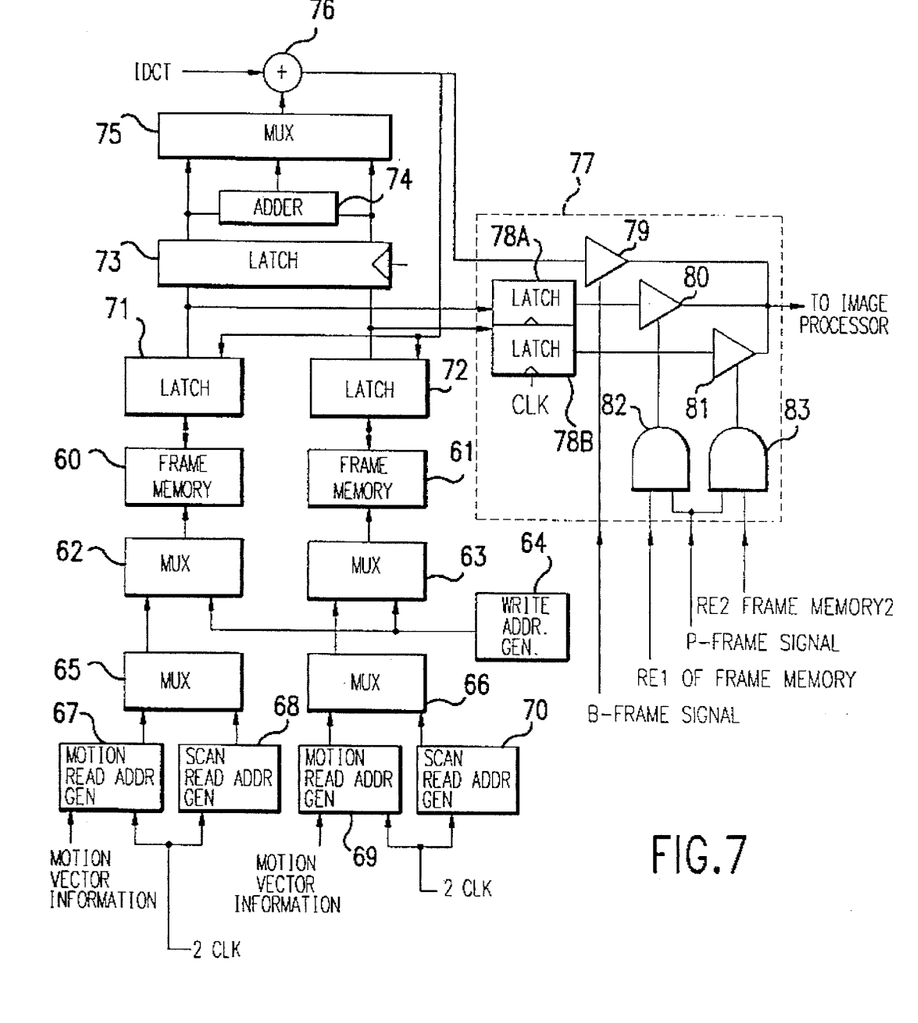
FIG.7 is a block diagram of the third embodiment according to the present invention.

FIG. 7 shows a block diagram of the third embodiment of the B-frame image processing apparatus which employs two frame memories instead of the FIFO memory 57 in the second embodiment.

The B-frame processing apparatus according to the third embodiment is provided with first and second frame memories 60 and 61 for reading and writing a frame image signal, first and second multiplexers 62 and 63 for selectively providing read/write addresses of the frame memories 60 and 61, a write address generator 64 for generating write addresses of the frame memories and providing the addresses to the multiplexers 62 and 63, third and fourth multiplexers 65 and 66 for respectively selecting a motion read address and a scan address and providing the addresses to the multiplexers 62 and 63, first motion read address generator 67 for generating a motion read address of the first frame memory 60 and providing the address to the third multiplexer 65 when its inputs are motion vectors and 2CLK, a first scan read address generator 68 for generating a scan read address of the first frame memory 60 and providing the address to the third multiplexer 65 when its input is 2CLK, a second motion read address generator 69 for generating a motion read address of the second frame memory 61 and providing the address to the fourth multiplexer 66 when its inputs are motion vectors and 2CLK, a second a scan read address generator 70 for generating scan read address of the second frame memory 61 and providing the address to the fourth multiplexer 66 when its input is 2CLK, bidirectional latches 71 and 72 for respectively receiving and providing frame image signals from/to the frame memories 60 and 61, a latch 73 for synchronizing the output image signals of the latches 71 and 72 with the clock CLK and providing the synchronized signals, a mean value calculating section 74 for averaging the output image signals of the latch 73, a multiplexer 75 for selectively providing the output image signal from the latch 73 and the averaged image signal, an adder 76 for adding the output image signal of multiplexer 75 and an IDCT-transformed image signal, and an image output adjusting section 77 for adjusting the frame image signal provided from the adder 76 in accordance with the display order.

Meanwhile, the image output adjusting section 77 comprises latches 78A and 78B for synchronizing the output image signals of bi-directlonal latches 71 and 72 with the clock CLK, respectively, a buffer 79 which is enabled in accordance with the B-frame signal in order to switch the output image signal of the adder 76, a buffer 80 which is enabled in accordance with the read enable and P-frame signal of the first frame memory 60 in order to switch the output of the latch 78A, a buffer 81 which is enabled in accordance with the read enable and P-frame signal of the second frame memory 61 in order to switch the output of the latch 78B, an AND gate 82 for AND-gating the P-frame signal and the read enable signal of the first frame memory and providing the result to the buffer 80 as a control signal, and an AND gate 83 for AND-gating the P-frame signal and the read enable signal of the second frame memory and providing the result to the buffer 81 as a control signal.

The operation of the B-frame image processing apparatus according to the third embodiment constructed as above will now be described.

The construction and read operation of the first and second frame memories 60 and 61 are equal to those of the second embodiment except for the fact that the read addresses of the frame memories 60 and 61 are read at twice the speed in accordance with the clock 2CLK whose speed is twice as high as that of the second embodiment.

Specifically, the first frame memory 60 selectively receives through the third multiplexer 65 and the first multiplexer 62, the motion read address generated by the first motion read address generator 67 whose input are motion vectors and 2CLK, and the scan address generated by the first scan address generator 68 whose input is 2CLK. On the other hand, the second motion read address generator 69 whose inputs are motion vectors and 2CLK generates the motion read address and the scan address generator 70 whose input is 2eLK generates the scan read address. The generated addresses are selectively provided through the fourth multiplexer 66 and the second multiplexer 63 to the second frame memory 61. Further, write addresses of the first and second frame memories 60 and 61 are generated from the write address generator 64. That is, the write addresses and the read addresses are selectively provided through the first and second multiplexers 62 and 63.

Figure 8:
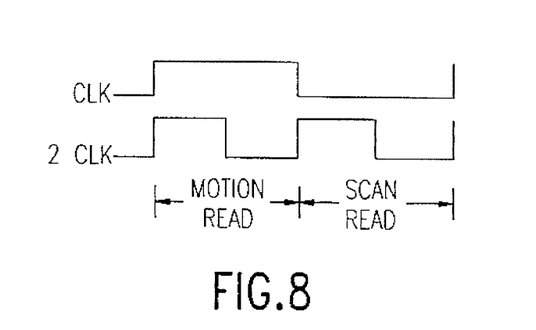
FIG.8 is a signal timing diagram of the third embodiment according to the present invention.

Accordingly, as shown in FIG. 8, the read timing of the motion vectors and the read timing of the scan image are different from each other as much as one clock CLK in accordance with the clock CLK and the twice clock 2CLK, and the speed of the read clock becomes twice. Since the address is regarded as the motion-compensated address when the read clock has a 'high' level and the address is regarded as the output scan address when the read clock has a 'low' level, the address generators 67, 68, and 69, 70 are required for generating respective addresses in accordance with the twice clock 2CLK, motion read and scan read.

In order to change the clock period of the motion-compensated image signal and the output scan image signal having been respectively read according to the half of the original clock as stated above, the latches 73, 78A and 78B which operate in accordance with the clock CLK are provided at the output terminals of the frame memories. In the first and second frame memories 60 and 61 which receive such read/write addresses, the frame image signal is stored and provided corresponding to the timing as shown in FIG. 6 like that of the second embodiment.

The frame image is stored according to the following route: the frame image signal provided from the adder 76 is stored in both of the frame memories 60 and 61, the image signals provided from the frame memories 60 and 61 are respectively provided through the bi-directional latches 71 and 72, and the frame image signals provided from the latches 71 and 72 enter the latch 73 and simultaneously, enter the latches 78A and 78B in image output adjusting section 77.

Besides, the frame image signals provided from the latch 73 are averaged by the mean value calculating section 74. Multiplexer 75 provides selectively one of the two frame image signals or the averaged image signal of the two frame image signals. The output image signal of the multiplexer 75 is added to the image signal the by' adder 76.

The image signal added by the adder 76 enters the respective frame memories 60 and 61 through the bidirectional latches 71 and 72 and simultaneously enter the buffer 79 in the image output adjusting section 77.

On the other hand, since the frame image is stored like I, P1, P2, P1, . . . in the frame memories 60 and 61 irrespectively of the output order as stated abovethe, output adjusting section 77 may adjust the output sequence corresponding to the frame order.

First, if the input signal is a P-frame and there is provided a read enable signal RE1 for the first frame memory 60 when the first frame memory 60 performs the read operation and provides the result as shown in the timing diagram of FIG. 6, the AND gate 82 AND-gates the two signals so as to enable the buffer 80. When the buffer 80 is enabled, the frame video signal of the first frame memory 60, which signal may be latched and provided by the latch 78A, enters the image processing section.

In addition, if the input signal is a P-frame and there is provided a read enable signal RE2 for the second frame memory 61 when the second frame memory 61 performs the read operation and provides the result, the AND gate 83 AND-gates the two signals so as to enable the buffer 81. When the buffer 81 is enabled, the frame image signal of the second frame memory 61, which signal may be latched and provided by the latch 78B, enters the image processing section.

Besides, in the case of a B-frame, when the buffer 79 is enabled by the B-frame signal, the adder 76 provides a B-frame image signal to the image processing section.

According to the third embodiment of the present invention, if there is a motion compensating apparatus whose unit is a half pixel which is composed of half pixel motion compensators 15 and 16, multiplexers 17 and 18, and FIFO memories 19 and 20 as shown in FIG. 1, between the hi-directional latches 71 and 72 and the latch 73, motion compensation in the unit of a half pixel can be performed and thus the B-frame processing apparatus for the image signal which is motion compensated in the unit of a half pixel considering B-frame can be implemented.

Motion compensating apparatus whose unit is a half pixel according to the third embodiment has the same construction and operation as those of the first embodiment and thus the descriptions thereof will be omitted. Besides, the selection of the multiplexers 62, 63, 65, 66 and 75 is controlled in accordance with the same control signal as that of the first or second embodiment.

Figure 9:
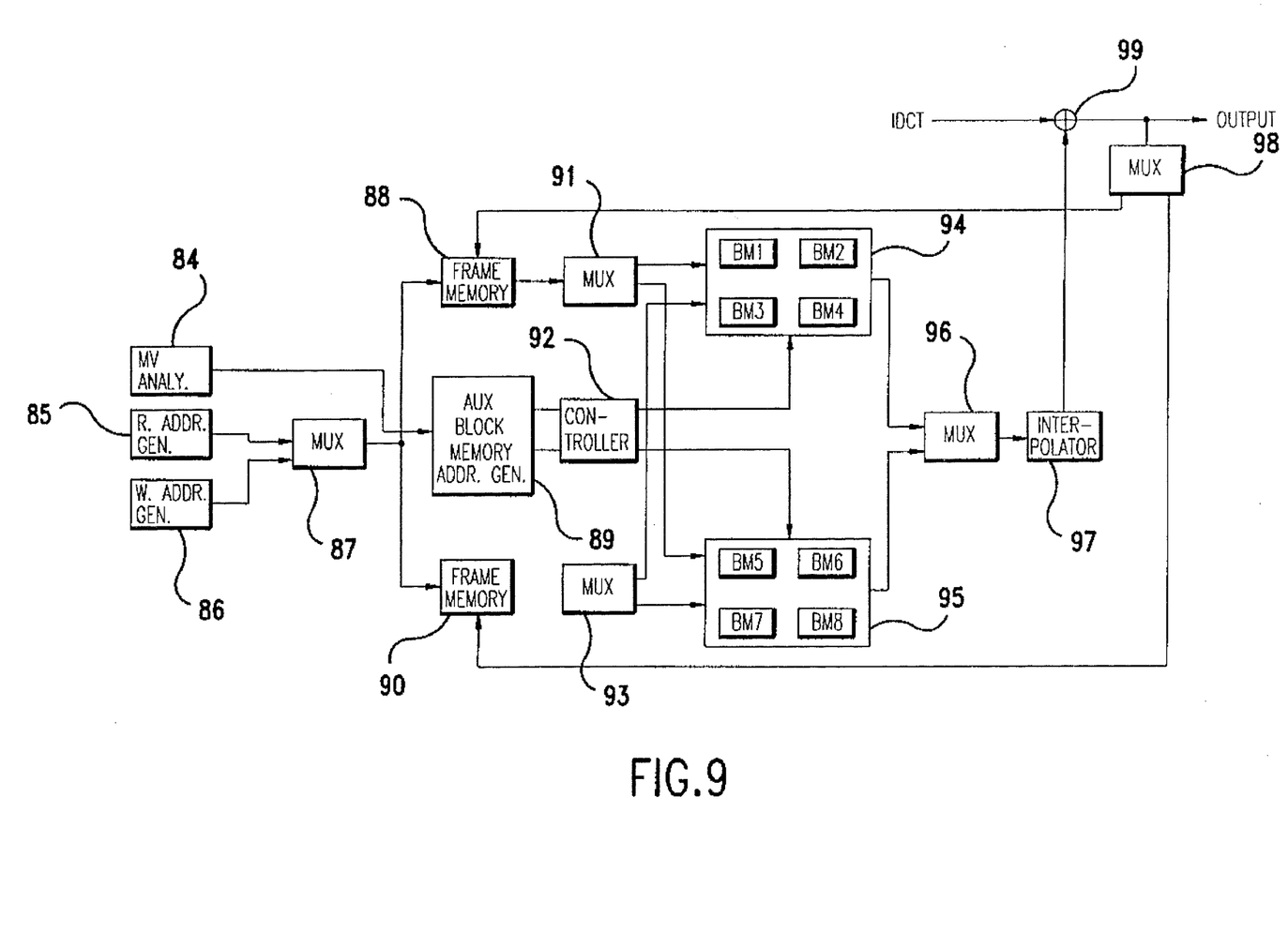
FIG.9 is a block diagram of the motion compensating apparatus in the unit of a half pixel according to the present invention.

Meanwhile, FIG. 9 shows another embodiment of an image motion compensating apparatus whose unit is a half pixel according to the present invention. With reference to FIG. 9, the image motion compensating apparatus whose unit is a half pixel is provided with a variable length decoder 1 for decoding an encoded input image data and the motion vectors, a restoring section 2 for performing inverse quantization and IDCT transform with respect to the decoded image data from the decoder 1, a delay and order adjusting section 3 for adjusting the process of IDCT transformed motion compensation with respect to the output image signal from the restoring section 2, a motion vector analyzing section 84 for analyzing the values of motion vectors in order to calculate the address point which corresponds to the displacement to be motion-compensated for from the values of the motion vectors provided by the decoder 1, a read address generating section 85 for generating a data read address whose unit is a block to be compensated for in accordance with a frame synchronizing signal of the image data from the decoder 1, a write address generator 86 for generating the data write address whose unit is a block to be compensated for in accordance with the frame synchronizing signal of the image data from the decoder 1, a multiplexer 87 for selectively providing the output address of the read addresses generating section 85 and the write address generating section 86 in the unit of frame, first and second frame memories 88 and 90 for alternately reading/writing the output image data of the multiplexer 87 in accordance with the read/write address provided from the multiplexer 87, an auxiliary block memory address generating section 89 for generating the read address of an auxiliary block memory enabled to calculate pixel values corresponding to the motion vectors whose unit is a half pixel and receives the value of the motion vectors provided from the motion vectors analyzing section 84, a multiplexer 91 for providing the output data of the first frame memory 88 to first and second auxiliary block memory sections 94 and 95, alternately, a multiplexer 93 for providing the output data of the second frame memory 90 to first and second auxiliary block memory sections 94 and 95 alternately, an auxiliary block memory and interpolation controlling section 92 for controlling the read points of first and second auxiliary memory sections 94 and 95 and controlling the enable timing of an interpolation section 97 by combining the values of the motion vectors and the output address of the auxiliary block memory address generation section 89, first and second auxiliary block memory sections 94 and 95 for providing output data of the multiplexer 91 or 93 and then providing data which correspond to half pixel motion vectors in accordance with the control signal provided from the auxiliary block memory and interpolation controlling section 92, a multiplexer 96 for selectively providing to the interpolation section 97 the output data of the first and second auxiliary block memory sections 94 and 95, an interpolation section 97 for generating the final motion-compensated image data in accordance with the value of the half pixel motion vectors by operationally processing the output data of the multiplexer 96, an adder 99 for adding the motion-compensated image data provided from the interpolation section 97 to the inverse-quantized and IDCT-transformed image data provided from the delay and order adjusting section 3, and a multiplexer 98 for selectively providing the image data from the adder 99 to the first and second frame memories 88 and 90 in the unit of a frame.

The operation of the image motion compensation apparatus whose unit is a half pixel constructed as above will now be described.

First, in order to perform motion-compensation in the unit of a half pixel, motion vectors whose unit is a pixel should be obtained in the side and one of the motion vectors whose unit is a half pixel and which include the eight points around the very pixel and the original point, i.e., nine points should be also obtained. The motion vector MV_HP whose unit is a half pixel is obtained with respect to the motion vector MV_P whose unit is a pixel according to the following equations:

$$MV\_HP=(MV\_P\pm0.5)\times2,$$

$$MV\_HP=(MV\_P+0)\times2 \text{ (original point)}$$

When the search region is within the range of −16 to +15, the motion vector MV consists of motion vectors MVX and MVM which respectively have 6-bit information MV5-MV0 in the X and Y directions with respect to the displacement of the pixel value.

At this point, the vector MV5 is a sign bit, the vectors M4-MV1 indicate the magnitude of the motion vector, and the vector MV0 is a half pixel bit. Accordingly, the least significant bit, i.e., vectors MVX0 and MVY0 and the most significant bit, i.e., vector MV5 can provide to the decoder in the receiving side the information whose unit is a half pixel.

The information provided to the decoder as stated above enters the image motion compensating apparatus whose unit is a half pixel according to the present invention shown in FIG. 9. That is, the variable length decoder 1 decodes the information of the encoded input video signal and provides the decoded information to each of the restoring section 2, the motion vector analyzing section 84, the read address generating section 85 and the write address generating section 86, respectively. The restoring section 2 restores the image data by performing inverse quantization and IDCT transform with respect to the transmitted image data which is quantized and DCT-transformed on the transmitting side. The restored data is provided to the adder 99 through the delay and order adjusting section 33.

On the other hand, the decoded information from the variable length decoder 1 consists of the values of the motion vectors, the frame synchronizing signal, the macro block address MBA which is the position value of a processed block(16×16 pixels) to be compensated for, and the macro slice address MSA, and is provided to each of the motion vector analyzing section 84, the read address generating section 85 and the write address generating section 86, respectively.

The motion vector analyzing section 84 calculates the address point which corresponds to the displacement to be motion compensated for in accordance with each of the six bits of the respective motion vectors MVX and MVY provided from the variable length decoder 1, the macro block address MBA and the macro slice address MSA, and then provides the calculated information to the auxiliary block memory address generating section 89(where, the macro block is a processed block whose unit is a pixel and 1 macro blocks=2×2 block and 1 block=8×8 pixels).

In addition, the read address generating section 85 generates the read addresses of the frame memories 88 and 90 in the unit of a block by counting the frame synchronizing signal and provides the read addresses to the multiplexer 87, while the write address generating section 86 generates the write addresses of the frame memories 88 and 90 in the unit of a block by counting the frame synchronizing signal and provides the write addresses to the multiplexer 87.

In order to make the first frame memory 88 store the output image data of the multiplexer 98 and to make the second frame memory 90 provide the data having been stored for the previous frame at one timing, the multiplexer 87 provides the write address to the first frame memory 88 and the read address to the second frame memory 90.

At the next timing, the first frame memory 88 receives the read address in order to provide the image data stored therein and the second frame memory 90 receives the write address in order to provide the image data stored at the previous timing. This operation is repeated in the unit of a frame and thus the first frame memory 88 and the second frame memory 90 can perform the read/write operation, alternately.

The image data to be read out from the first frame memory 88 or the second frame memory 90 are displaced as much as the values of motion vectors and then read out in the unit of a block. In addition, the data has 17×17 pixels which ie increased by one pixel in the displacement directions X and Y in order to motion compensate in the unit of a half pixel.

Figure 10:
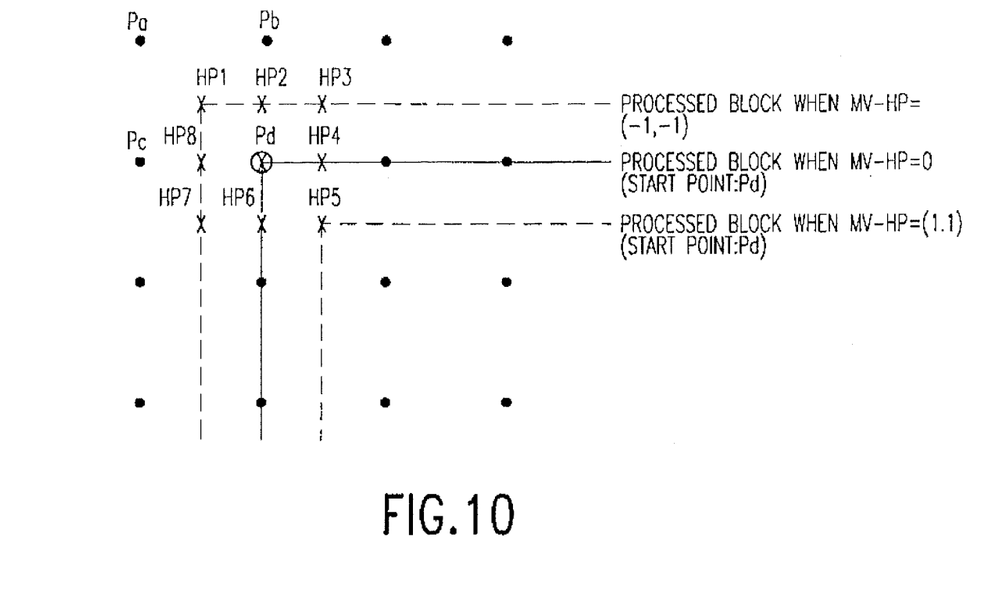
FIG.10 shows a processed block for motion compensation in the unit of a half pixel according to the present invention.

In other words, since the pixel values of the points which are around the boundary of a pixel to be actually obtained are also required for interpolating the value of the half pixel point, it is necessary to read the processed block which is increased by one pixel in the displacement directions X and Y, respectively, and whose starting point is determined as shown in FIG. 10.

FIG. 10 shows the starting point of the processed block whose unit is a half pixel. The starting point is fixed to Pd when the half pixel vector is HP1 (−1,−1), to Pb when the half pixel vector is HP2 (0,−1), or HP3 (1,−1), to the original point, Pd, when the half pixel vector is one of the Pd (0,0), HP4 (1,0), HP5 (1,1) and HP6(0,1), and to the Pc when the half pixel vector is HP7 (−1,1) or HP8 (−1,0).

The first frame memory 88 reads the pixel value as stated above and provides the value to the multiplexer 91 in order to perform motion compensation. The multiplexer 91 provides and stores the pixel value in the first and second auxiliary block memory sections 94 and 95, alternately, in the unit of a block.

Besides, the output data of the second frame memory 90 is alternately provided and stored in the first and second auxiliary block memory sections 94 and 95 in the unit of a block.

Specifically, the 17×17 pixel values among the values read out from the frame memories 88 and 90 are temporarily stored in the first to fourth auxiliary block memories BM1 to BM4 (17×17 bytes)of the first auxiliary block memory sections 94 at the same time. When the pixel values read out from the next block are occurred, the pixel values read out from the frame memories 88 and 90 are respectively stored in the first to fourth auxiliary block memories BM5 to BM8 of the second auxiliary block memory sections 94 and, at this timing, the auxiliary block memories BM1 to MB4 of the first auxiliary block memory section 94 provide the pixel values which are temporarily stored for calculating the pixel values in accordance with the half pixel motion vector.

Multiplexers 91 and 93 may store the pixel values by providing the output pixel values of the frame memories 88 and 90 to the auxiliary block memory sections 94 and 95, alternately, and may provide the pixel values by receiving the read point control signal from the auxiliary block memory and interpolation controlling section 92.

The auxiliary block memory address generating section 89 produces the processed block read address of the frame memories 88 and 90 whose unit is a half pixel by combining the value of the motion vector having been analyzed and provided by the motion vectors analyzing section 84 and the processed block read address whose unit is a pixel. The produced read address is alternately provided to the first and second auxiliary block memory sections 94 and 95 by the multiplexer 94 and thus the pixel value which corresponds to the half pixel motion vector can be provided.

Figure 11:
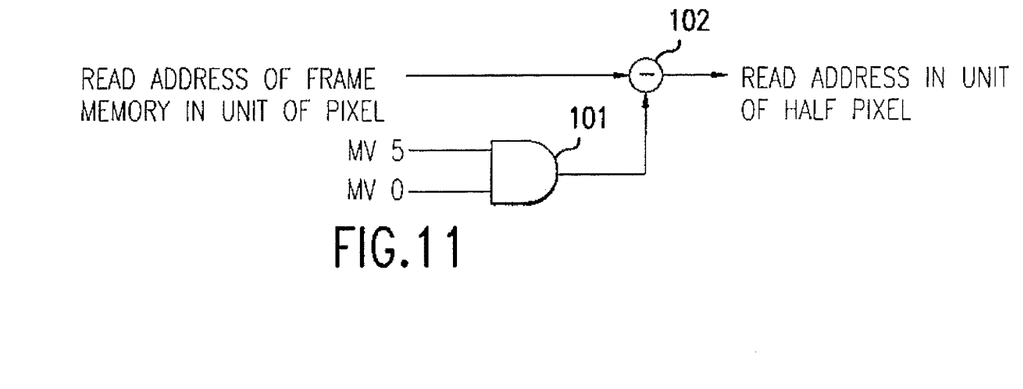
FIG. 11 is a detailed circuit diagram of the auxiliary block memory address generating section in the motion compensating apparatus according to the present invention.

FIG.11 is a circuit diagram of the auxiliary block memory address generating section 89 as stated above. Referring to FIG.11, the address generating section 89, which are provided according to the directions X and Y of the motion vector respectively, comprises an AND gate 101 for ANDgating the sign bit MV5 (the most significant bit) of the motion vector and the half pixel information bit MV0(the least significant bit), and a subtractor 102 for subtracting the processed block read address of the frame memory whose unit is a pixel from the output of the AND gate 101 in order to generate the read address of the processed block in the unit of a half pixel.

Though the original point for processing the block in the unit of a pixel may be fixed as shown in FIG. 10, the starting points for the processed block (17×17 pixels) in the unit of a half pixel are varied in accordance with the value of the motion vector whose unit is a half pixel. For example, when the pixel point Pd among points Pa to Pd is to be the starting point for the processed block according to the motion vector MV whose unit is a pixel, the starting point for the 17×17 pixels of the auxiliary block memory sections 94 and 95 is regarded as data for the processed block whose unit is a half pixel considering the interpolation value in the unit of a half pixel, and is fixed to one of the pixel points Pa to Pd in accordance with the AND-gated signal of the sign bit MV5 and the least significant bit MV0 by the AND gate 101 and the subtracted value of the processed block read addresses of the frame memories 88 and 90 whose unit is a pixel by the subtractor 102 as shown in FIG.10. According to the fixed read address, the auxiliary memory BM1 to MB4 to be used may be determined and may provide the pixel value for motion compensation in the unit of a half pixel, As stated above, the auxiliary block memory section 94 and 95 can provide the pixel value for motion compensation in the unit of a half pixel according to the read address and the half pixel motion vector MV0.

Figure 12:
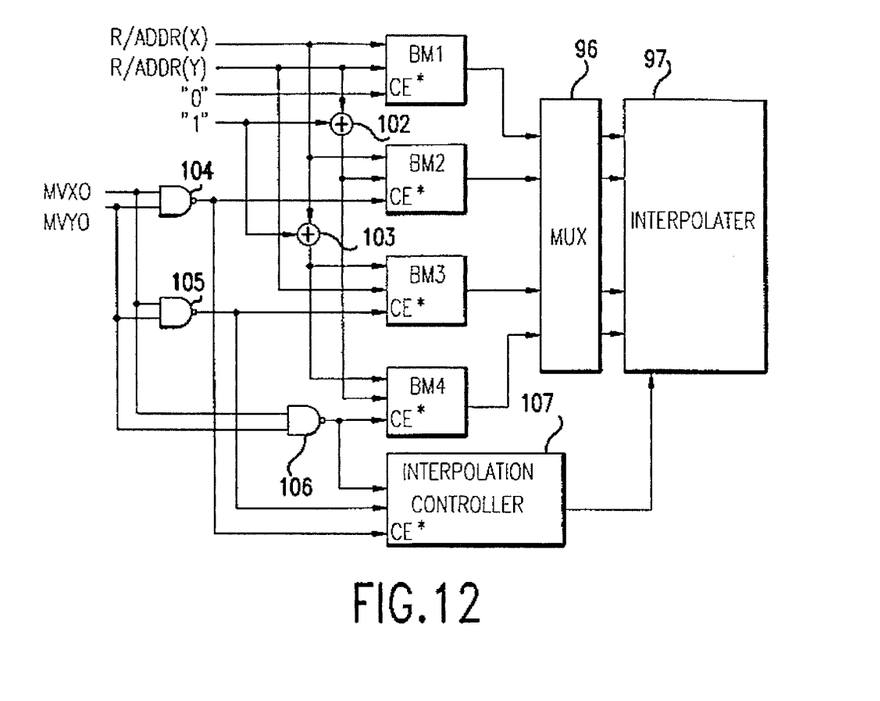
FIG. 12 is a detailed circuit diagram of the auxiliary block memory and interpolation control section in the motion compensating apparatus according to the present invention.

FIG.12 shows one embodiment of the auxiliary block memory and interpolation controlling section 92 for controlling the auxiliary block memory sections 94 and 95. The controlling section 92 i8 designed for controlling one of the first and second block memory sections 94 and 95 and comprises a pair of control circuits whose constructions are equal to each other for controlling the respective auxiliary block memory sections 94 and 95.

Referring to FIG. 12, the auxiliary block memory and interpolation controlling section 92 includes adders 102 and 103 for adding the read addresses R/ADDR(X) and R/ADDR(Y) provided from the auxiliary block memory address generating section 89 in order to provide the respective block addresses of the auxiliary block memory sections 94 and 95, gates 104, 105 and 106 for combining the values MVXO and MVYO of the half pixel motion vector provided from the motion vector analyzing section 84 in order to control the respective chip enabling operation of auxiliary block memory sections 94 and 95, and an interpolation controlling section 107 for enabling the interpolation section 97 in the unit of a macro block according to the outputs of the gates 104, 105 and 106.

As shown in FIG. 12, the read address R/ADDR(X) generated by the auxiliary block memory address generating section 89 is provided to the first and second auxiliary block memories BM1 and BM2 and thus the pair of auxiliary block memories BM1 and BM2 are assigned by the same address in the X direction of the displacement. The above read address R/ADDR(X) is increased by +1 through the adder 103 and then is provided to the third and fourth auxiliary block memories BM3 and MB4, thereby assigning the pair of auxiliary block memories BM3 and BM4 to the same address in the x direction of the displacement.

In,addition, the read address R/ADDR(Y) generated by the auxiliary block memory address generating section 89 is provided to the first and third auxiliary block memories BM1 and MB3 and thus the pair of auxiliary block memories BM1 and BM3, and thus the pair of auxiliary block memories BM1 and BM3 are assigned by the same address in the Y direction of the displacement. The above read address R/ADDR(Y) is increased by +1 through the adder 102 and then is provided to the second and fourth auxiliary block memories BM2 and BM4, thereby assigning the pair of auxiliary block memories BM2 and BM4 to the same address in the Y direction of the displacement.

Meanwhile, the first auxiliary block memory BM1 is chip-enabled (CE*) by "o" signal and the second auxiliary block memory BM2 is always chip-enabled (CE,) by the AND-gated signal of the values of the motion vectors MVXO and MVYO from the gate 104. Besides, the third auxiliary block memory BM3 is chip-enabled (CE*) by the AND-gated signal of the values of the motion vectors MVXO and MVYO from the gate 105 and the fourth auxiliary block memory BM4 is chip-enabled (CE*) by the AND-gated signal of the values of the motion vectors MVXO and MVYO from the gate 106. Interpolation controlling section 107 receives the output signals of the gates 104, 105 and 106 and then provides to the interpolation section 97 a control signal which enables the interpolation section 97 at the timing when signal processing in the unit of a macro block by means of the auxiliary block memory is completed.

Interpolation section 97 calculates the mean value, in terms of the half pixel, of the control signals (the chip-enable signals of the auxiliary block memories BM1 to BM4) and the four-phase image date(pixel values) and thus provides the final output pixel value to the adder 99.

Figure 13:
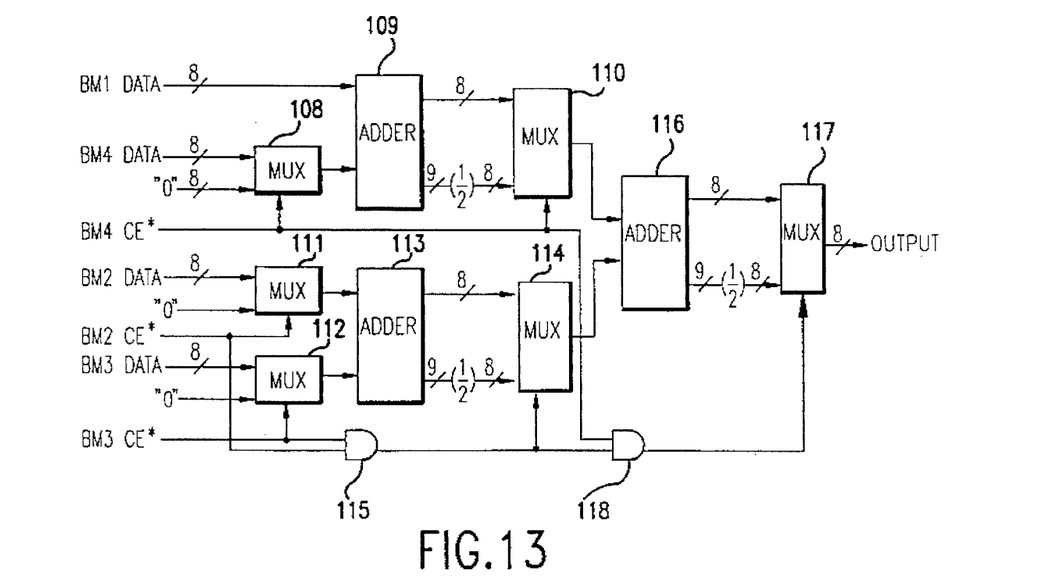
FIG. 13 is a detailed circuit diagram of the interpolating section in the motion compensating apparatus according to the present invention.

FIG. 13 is a block diagram of an embodiment of the interplation section 97 as stated above. Referring to FIG. 13, the interpolation section 97 comprises multiplexers 108, 111 and 112 for selecting the data read out from the auxiliary block memory sections 94 and 95 in accordance with the control signal of the auxiliary block memory and interpolation controlling section 92, adders 109 and 113 for adding the data selected by the multiplexers 108, 111 and 112, multiplexers 110 and 114 for selecting the added data and the data divided into a half in accordance with the control signal of the auxiliary block memory and interpolation controlling section 92, an adder 116 for adding the selected data by the multiplexers 110 and 114, a multilexer for selecting the added data and the data divided into a half in accordance with the control signal of the auxiliary block memory and interpolation controlling section 92 in order to provide the controlling the operation of selecting data from the multiplexers 114 and 117 by AND-gating the control signals of the auxiliary block memory and interpolation controlling section 92.

The interpolation section 97 performs an adding operation and multiplexing operation with respect to the data from two pairs of the auxiliary block memories BM1, BM4 and BM2, BM3.

That is, 8-bit data of the auxiliary block memory BM4 and "o" value enter the 2:1 multiplexer 108. This multiplexer 108 selects and provides the input data in accordance with the chip-enable signal CE*(provided from the interpolation controlling section 107) of the auxiliary block memory BM4. The output data of the multiplexer 108 are added to the data of the auxiliary block memory BM1 by 9-bit adder 109 and enter the 2:1 multiplexer 110 in the next stage.

The 2:1 multiplexer 110 selects and provides the data from the adder 109 and the ½ input data in accordance with the chip-enable signal CE*, of the auxiliary block memory BM4. When the chip-enable signal is in the 'low' level, the data divided into a half is provided to the 9-bit adder 116.

on the other hand, the 2:1 multiplexer 111 receives the data of the auxiliary block memory BM2 and "o" value and selects the input data in accordance with the chip-enable signal CE* of the auxiliary block memory BM2 and then provides the selected data to the 9-bit adder 113. The 2:1 multiplexer 112 receives the data of the auxiliary block memory BM3 and "o" value and selects the input data in accordance with the chip-enable signal CE* of the auxiliary block memory BM3 and then provides the selected data to the 9-bit adder 113.

The 2:1 multiplexer 114 receives the output data added by the adder 113 and selects the added data and the data divided into a half in accordance with the chip-enable signals BM2 CE* and BM3 CE*, which are AND-gated by the AND gate 115 and then provides the selected data to the adder 1196.

Adder 116 adds the data provided from the multiplexers 110 and 114 and then provides the data to the 2:1 multiplexer 117 in the next stage. Multiplexer 117 selects the data from the adder and the data divided into a half in accordance with the chip-enable signals BM4 CE*, BM2 CE*, and BM3 CE* which are AND-gated by the AND gate 118. When the output of the AND gate 118 becomes 'low', the data divided into a half is selected and provide as the half pixel mean value (final output) which is motion-compensated for in the unit of a half pixel.

According to the embodiment, in order to achieve stable adding operation and stabilization of the whole system by processing the data in accordance with a twice main clock, multiplexers and adders are connected in series and thus the signal selection operation and the adding operation are repeated alternately.

Also, when the decoder is composed of a number of frame memories divided in parallel in the horizontal or vertical direction due to the limit of the processing speed, the present embodiment may perform compensation in the unit of half pixel by applying the apparatuses of FIG. 9 in parallel as many as the number of divided frame memories.

From the foregoing, according to the present invention, the whole construction may be simplified and the cost may be reduced because the B-frame image can be processed utilizing only a few memories. Further, the motion compensation in the unit of a half pixel may be performed in real time, thereby providing high picture quality.

What is claimed is:

1. A motion compensating apparatus in the unit of a half pixel, comprising:

a variable length decoder for decoding an encoded input image data and motion vector information;

a restoring means for inverse-quantizing and IDCT-transforming the decoded image data from said variable length decoder;

a delay and order adjusting means for adjusting the IDCT transform and motion compensation with respect to the image signal provided from said restoring means;

a motion vector analyzing means for analyzing the value of a motion vector by calculating the address point corresponding to the displacement which is to be motion compensated for and by utilizing the value of the motion vector provided by said variable length decoder;

a read address generator for generating a data read address of a processed block to be compensated for by utilizing a frame synchronizing signal of image data from said variable length decoder;

a write address generator for generating a data write address of the processed block to be compensated for by utilizing a frame synchronizing signal of the image data from said variable length decoder;

a first multiplexer for selectively providing the addresses provided from said read address generator and said write address generator in the unit of a frame;

first and second frame memories for alternately reading/writing the image data provided from said first multiplexer in accordance with the read/write addresses provided from said first multiplexer;

an auxiliary block memory address generator, which receives the value of the motion vector provided from said motion vector analyzing means, for generating the read address of an auxiliary block memory which is used to calculate the pixel value corresponding to a half pixel motion vector;

a second multiplexer for alternately providing the output data of said first frame memory to a first auxiliary block memory means and to a second auxiliary block memory means;

a third multiplexer for alternately providing the output data of said second frame memory to said first auxiliary block memory means and to said second auxiliary block memory means;

an auxiliary block memory and interpolation controlling means for controlling the read point of said first and second auxiliary block memory means and an enable timing of an interpolation means by combining the address outputted from said auxiliary block memory address generating means and the value of the motion vector;

said first and second auxiliary block memory means for providing data corresponding to the half pixel motion vector in accordance with the control signal provided from said auxiliary block memory and interpolation controlling means after storing the data provided from said second or third multiplexer therein;

a fourth multiplexer for selectively providing the output data of said first or second auxiliary block memory means to an interpolation means;

said interpolation means for generating image data which is finally motion-compensated corresponding to the value of the half pixel motion vector by calculating the data provided from said fourth multiplexer;

an adder for adding the motion-compensated image data from said interpolation means to the inverse-quantized and IDCT-transformed image data from said delay and order adjusting means; and a fifth multiplexer for providing the image data provided from said adder to said first and second frame memories in the unit of a frame.

2. A motion compensating apparatus in the unit of a half pixel as claimed in claim 1, wherein said auxiliary block memory address generator comprises:

an AND gate for AND-gating the sign bit (the most significant bit, MV5) of the motion vector MV and the half pixel motion vector bit (the least significant bit, MVO); and a subtractor for subtracting the processed block read address of one of said frame memories in the unit of a pixel from the output of said AND gate in order to generate the processed block read address in the unit of a half pixel.

3. Motion compensating apparatus in the unit of a half pixel as claimed in claim 1, wherein said auxiliary block memory and interpolation controlling means comprises:

first and second adders for adding the read addresses R/ADDR(X) and R/ADDR(Y) provided from said auxiliary block memory address generator means and providing the memory block addressee of said first and second auxiliary block memory means, respectively;

first through third gates for controlling the memory block chip-enable operation of said first and second auxiliary block memory means by gating the values of the half pixel motion vectors MVXO and MVYO provided from said motion vector analyzing means; and an interpolation controlling means for enabling said interpolation means in accordance with the outputs of said first through third gates in the unit of a macro block.

4. A motion compensating apparatus in the unit of a half pixel as claimed in claim 1, wherein said interpolation means comprises:

- first through third multiplexers for selecting the data read out from said first and second auxiliary block memory means in accordance with the control signal of said auxiliary block memory and interpolation controlling means;
- first and second adders for adding the data selected by said first throught third multiplexers;
- fourth and fifth multiplexers for selecting said added data and data divided into a half in accordance with the control signal of said auxiliary block memory and interpolation controlling means;
- a third adder for adding the data selected by said fourth and fifth multiplexers;
- a sixth multiplexer for selecting the added data and the data divided into a half in accordance with the control signal of said auxiliary block memory and interpolation controlling means and finally providing half pixel mean value; and
- first and second AND gates for gating the control signals of said auxiliary block memory and interpolation controlling means and controlling the data selecting operation of said fifth and sixth multiplexers.

* * * * *